United States Patent
Zamel et al.

[11] Patent Number: 5,881,088
[45] Date of Patent: Mar. 9, 1999

[54] FACE-COOLED HIGH-POWER LASER OPTIC CELL

[75] Inventors: James M. Zamel, Hermosa Beach; Daniel F. Hall, Torrance, both of Calif.

[73] Assignee: TRW Inc., Redondo Beach, Calif.

[21] Appl. No.: 780,246

[22] Filed: Jan. 8, 1997

[51] Int. Cl.$^6$ .................................................. H01S 3/08
[52] U.S. Cl. .............................. 372/92; 372/34; 372/103; 372/98
[58] Field of Search ...................... 378/92, 34; 372/103, 372/98, 100

[56] References Cited

U.S. PATENT DOCUMENTS

| | | |
|---|---|---|
| 1,111,093 | 9/1914 | Preddey . |
| 4,030,047 | 6/1977 | Fletcher et al. ............................. 372/34 |
| 4,057,332 | 11/1977 | Brubaker et al. ........................... 372/92 |
| 4,089,102 | 5/1978 | Soper et al. . |
| 4,957,358 | 9/1990 | Terada et al. . |
| 4,993,824 | 2/1991 | Bluege . |
| 5,002,378 | 3/1991 | Colarusso et al. . |
| 5,008,549 | 4/1991 | Crewe . |
| 5,128,953 | 7/1992 | Macken . |
| 5,130,839 | 7/1992 | Tomita . |
| 5,283,695 | 2/1994 | Ziph-Schatzberg et al. . |
| 5,313,333 | 5/1994 | O'Brien et al. . |
| 5,375,015 | 12/1994 | Itoh et al. . |
| 5,390,228 | 2/1995 | Niibe et al. . |
| 5,408,362 | 4/1995 | Krim . |
| 5,455,838 | 10/1995 | Heritier et al. . |
| 5,471,036 | 11/1995 | Sperbeck . |

*Primary Examiner*—Leon Scott, Jr.
*Attorney, Agent, or Firm*—Michael S. Yatsko

[57] ABSTRACT

An optic cell 20 for use in the cavity of a high-power laser comprises an optic housing 22 which defines a first laser beam aperture 26. An optic element 32 such as a mirror or lens is disposed within the optic housing. A first indium layer 30 is between and in abutting contact with the optic housing and the optic element. An optic cover 40 defines a second laser beam aperture 46 therethrough substantially in alignment with the first laser beam aperture to form a window 47 of the optic element through which a laser beam passes. A second indium layer 48 is between and in abutting contact with the optic element and the optic cover. The optic housing and the optic cover are typically formed of aluminum or copper to passively cool the optic element. The first and second laser beam apertures are configured to minimize the heat transfer distance between the optic element and the optic housing and optic cover, and to allow the laser beam to pass through the optic element without striking metal portions of the optic cell. An optic cell mount 61 removably clamps the optic cell in the laser cavity, and includes cooling elements 56, 76 for cooling the optic cell to control the optic element temperature.

20 Claims, 2 Drawing Sheets

FACE-COOLED HIGH-POWER LASER OPTIC CELL

BACKGROUND

The invention is directed to the field of high-power lasers and, more particularly, to a face cooled optic cell for use in laser cavities.

High-power laser systems are used to effect major changes in objects. Example applications of high-power laser systems include materials working, electronics manufacture, medical treatment, nuclear fusion and laser weapons.

In high power laser systems, mirrors and lenses that steer and transmit the laser beam are exposed to extremely high levels of optical power throughput and intensity. The substrate and substrate coatings of these optics are formed of materials carefully selected to minimize the absorption of energy from the laser beam. Despite these measures, most glass substrates and anti-reflective coatings absorb some very small fraction of power from the laser beam, resulting in their heating. This heating is detrimental to critical optics in the laser resonator, because the prescription of these optics change with temperature due to thermal expansion. The resultant dimensional changes caused by thermal expansion can ultimately produce beam distortion, unwanted beam steering and damage to components.

The physical properties of optical materials make it extremely difficult to remove heat from the optics during operation. Particularly, transmissive optical materials have very low thermal conductivities. Consequently, large thermal gradients occur in these materials during laser operation. Large thermal gradients and high surface temperatures in optics can cause localized convection currents in the surrounding air, resulting in instabilities in the beam. Hence, at some design value of optical throughput and intensity, it is necessary to provide cooling to the optics so they maintain their prescriptions and design temperatures during laser operation.

The cooling of optics can be either active or passive. Active cooling systems have a number of important disadvantages, including problems related to vibration and temperature control. In order to make the temperature control system function properly, special materials, coolants and instrumentation are required. These requirements increase the complexity and cost of the temperature control system. Passive cooling systems for optical elements provide the advantage of being less complex than active systems. Known passive cooling systems, however, are less than fully satisfactory.

Thus, there is a need for an improved cooling assembly for optic elements in high-power laser systems that (i) is passive and has a simplified construction; (ii) minimizes heating of the optic element due to absorption of laser light during laser operation; (iii) reduces localized convective currents near the surface of the optic element; and (iv) reduces temperature gradients in the optic element substrate.

SUMMARY

The present invention provides an improved cooling assembly for optical elements in high-power laser systems that satisfies the above-described needs. More specifically, the present invention provides an optic cell that (i) passively cools the optic element and has a simple, versatile construction; (ii) minimizes heating of the optic element due to absorption of laser light during laser operation; (iii) minimizes the surface temperature of the optic element, thereby reducing local convective air currents; (iv) minimizes temperature gradients and resultant dimensional changes in the optic element substrate, thereby reducing detrimental related effects.

In addition, the optic cell can include standardized locating features for the mechanical positioning of the optic element within the optic cell. The optic cell protects the optic element during storage and assembly. Furthermore, the optic cell design is modular, making it easy to replace in the laser cavity. No cooling system dismantling is required.

The optic cell according to the present invention is used in a laser cavity in which a laser beam is generated during operation. The optic cell comprises an optic housing which includes a wall defining a first laser beam aperture therethrough. An optic element is disposed within the optic housing. A first thermally conductive layer is disposed between and in abutting contact with the wall of the optic housing and the optic element. An optic cover is disposed within the optic housing and defines a second laser beam aperture therethrough substantially in alignment with the first laser beam aperture. A second thermally conductive layer is disposed between and in abutting contact with the optic element and the optic cover.

The optic housing and the optic cover are typically formed of a metal having a high coefficient of thermal conductivity.

The first and second thermally conductive layers are typically comprised of indium, which is easily deformable and has good thermal conductivity. The indium layers provide effective heat transfer between the optic element and the optic housing and the optic cover.

The optic cell can further comprise a thermally conductive material joining the optic cover to the optic housing. This material is typically indium which is applied as a solder joint.

The first and second laser beam apertures are typically substantially rectangular shaped to approximate the shape of the laser beam cross-section. The laser beam has a height and a width. The first and second laser beam apertures each typically have a height equal to about twice the height of the laser beam, and a width equal to about twice the laser beam width. This sizing of the apertures minimizes the heat transfer path from the window of the optic element through which the laser beam passes, to the optic housing and the optic cover. Consequently, temperature gradients in the optic element are minimized. Convective air currents proximate to the faces of the window are also minimized. The aperture sizing also allows stray laser light to pass through the window and not impinge on the metal portions of the optic cell.

The present invention is further directed to an optic cell mount. The optic cell mount comprises clamping elements for removably clamping the optic cell in the laser cavity, and cooling elements for cooling the optic cell during laser operation to remove heat from the optic element.

DRAWINGS

These and other features, aspects and advantages of the present invention will become better understood from the following description, appended claims and accompanying drawings, where:

DESCRIPTION

Figure 1:
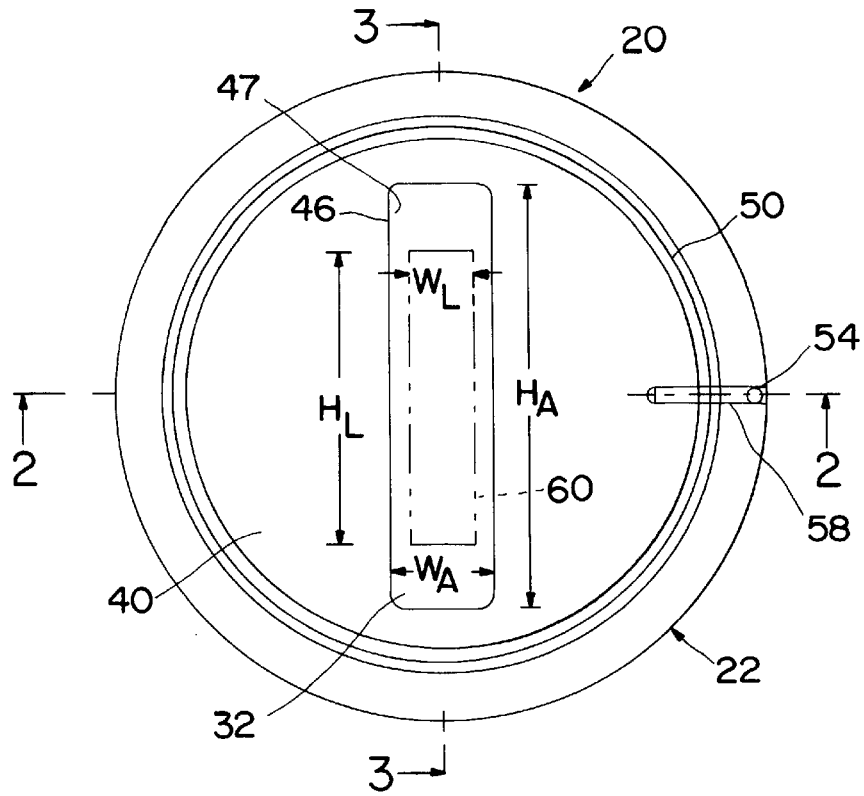
FIG. 1 is a rear elevational view of an optic cell in accordance with the present invention.
Figure 2:
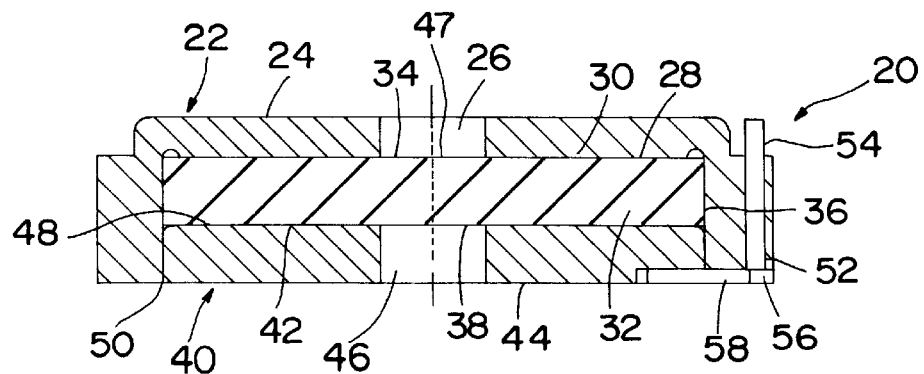
FIG. 2 is a cross-sectional view in the direction of line 2—2 of FIG. 1.
Figure 3:
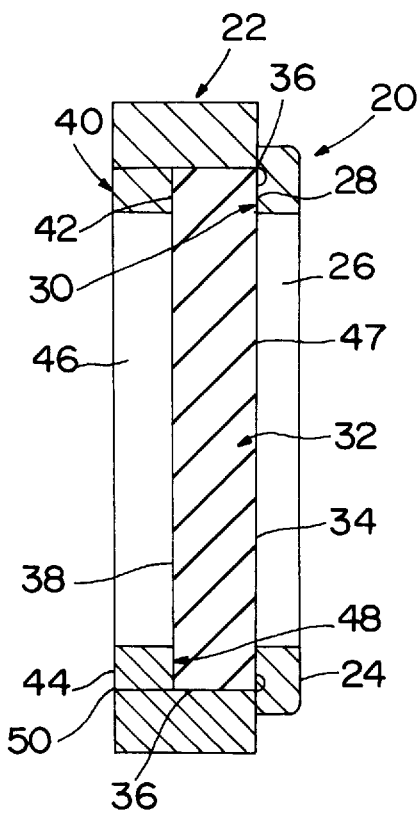
FIG. 3 is a cross-sectional view in the direction of line 3—3 of FIG. 1.

FIGS. 1–3 illustrate an optic cell 20 in accordance with the present invention. The optic cell 20 comprises an optic housing 22 having a front face 24 which defines a laser beam aperture 26 and a rear face 28. The illustrated aperture 26 is rectangular shaped, and has a width $W_A$ and a height $H_A$.

A first layer 30 of a thermally conductive material is provided on the rear face 28 of the optic housing 22. The first layer 30 is typically comprised of indium foil, which is soft and deformable to provide good thermal contact with the optic housing 22. The layer 30 typically has a thickness of less than about 0.010 in.

The optic housing 22 is typically comprised of a metal such as aluminum, copper or the like, having high thermal conductivity. The optic housing 22 can optionally be formed of suitable non-metallic materials having high thermal conductivity.

An optic element 32 having a front face 34, circumferential side 36 and a rear face 38 is disposed within the optic housing 22. Optic elements such as mirrors, lenses, prisms and polarizers can be used in the optic cell 22. The optic element 32 is comprised of a glass substrate typically having an anti-reflective coating to reduce reflective losses. The optic element 32 is fitted with sufficient pressure in the optic housing 22 to embed the front face 34 in the layer 30.

The optic element 32 can have one or more flat surfaces (not shown) formed in its perimeter for the mechanical positioning of the optic element 32 within the optic cell 20.

An optic cover 40 is disposed within the optic housing 22 behind the rear face 38 of the optic element 32. The optic cover 40 has a front face 42 and a rear face 44, and defines a laser beam aperture 46 extending therethrough between the front face 42 and the rear face 44. The aperture 46 typically has the same shape and dimensions as the aperture 26 in the optic housing 22. The aperture 46 is substantially aligned with the aperture 26 so as to define a window 47 of the optic element 32 through which the laser beam passes. The optic cover 40 is typically formed of the same material as the optic housing 22.

A second layer 48 is disposed between the optic cover 40 and the rear face 38 of the optic element 32 to provide heat transfer from the optic element 32 to the optic cover 40. The second layer 48 is typically comprised of the same material as the first layer 30. The optic cover 40 is typically embedded in the second layer 40.

The layers 30, 48 substantially cover the rear face 28 of the optic housing 22 and the front face 42 of the optic cover 40. The layers 30, 48 are not provided at the window portion 47 of the optic element 32.

The optic cover 40 is fixedly secured to the optic housing 22. For example, a circumferentially extending solder joint 50 can be formed between the optic housing 22 and the optic cover 40. The solder material is typically indium which has a low melting point (157° C.). The use of indium allows soldering to be conducted at low temperature, minimizing heating effects in the optic element 32. The optic cell 20 construction provides good thermal contact between the optic element 32 and the optic housing 22 and the optic cover 40 at the front face 34 and the rear face 38, respectively, of the optic element 32, and also provides good thermal contact between the optic cover 40 and the optic housing 22.

One or more longitudinal holes 52 can be formed through the optic housing 22 to receive elements such as pins 54 to adjust the optic cell 20 relative to the optic cell mount 61 shown in FIG. 4 and described below.

A transverse hole 56 can also be formed through the optic housing 22 and the optic cover 40 to receive an element such as a pin 58 to adjust and set the alignment of the apertures 26, 46 during securement of the optic cover 40 to the optic housing 22.

The optic element 32 can have a flat front face 34 and rear face 38 as shown, or the optic element 32 can have one or more curved faces (not shown) such as in curved mirrors and lenses. For such curved optic elements, the rear face 28 of the optic housing 22 and the front face 42 of the optic cover 40 are machined to have a matching contour to the adjacent face of the optic element to ensure uniform heat transfer from the optic element 32 to the optic housing 22 and the optic cover 40.

The aperture 26 in the optic housing 22 is sized and shaped to minimize the heat transfer distance from the optic element 32 to the optic housing 22 and the optic cover 40. As shown in FIG. 1, the cross-section of the laser beam 60 passing through the window 47 of the optic element 32 is substantially rectangular and has a height $H_L$ and a width $W_L$. The laser beam 60 typically also comprises other stray light waves (not shown) that are between the depicted laser beam 60 and the perimeter of the apertures 26, 46. During laser operation, it is important to prevent these stray light waves from impinging on the metal optic cover 40 and the metal optic housing 22, as this impingement can cause damage to the optic cell 20 and the laser. To prevent impingement of these stray light waves with metal, the height $H_A$ and width $W_A$ of the apertures 26, 46 (only the height and width of the aperture 46 are shown) are preferably equal to about twice the height $H_L$ and about twice the width $W_L$, respectively, of the laser beam 60. For example, for a laser beam 60 having a rectangular cross-section with a height $H_L$ of 2 in. and a width $W_L$ of 1 in., the rectangular apertures 26, 46 have a corresponding height $H_A$ of about 4 in. and a width $W_A$ of about 2 in. Accordingly, the cross-sectional area of the apertures 26, 46 are equal to about four times the cross-sectional area of the laser beam, for rectangular shapes. This relative sizing of the apertures 26, 46 also minimizes the path for heat transfer from the optic element 32 to the optic housing 22 and the optic cover 40.

The construction of the optic cell 20 allows the optic element 32 to be passively cooled by intimate thermal contact with the optic housing 22 and the optic cover 40, as close as possible to the incident, high-power laser beam 60. Consequently, the poor thermal conductivity of the optic element 32 is effectively short-circuited by the high thermal conductivity of the optic housing 22 and the optic cover 40, and, as a result, the temperature increase of the optic element 32 due to partial absorption of the laser beam 60 is minimized. The optic housing 22 and the optic cover 40 give thermal mass to the optic element 32 and effectively increase its thermal conductivity. As a result, for a given quantity of heat absorbed during laser operation, the temperature of the optic element 32 increases a significantly smaller amount than would otherwise without the optic cell 20.

Figure 4:
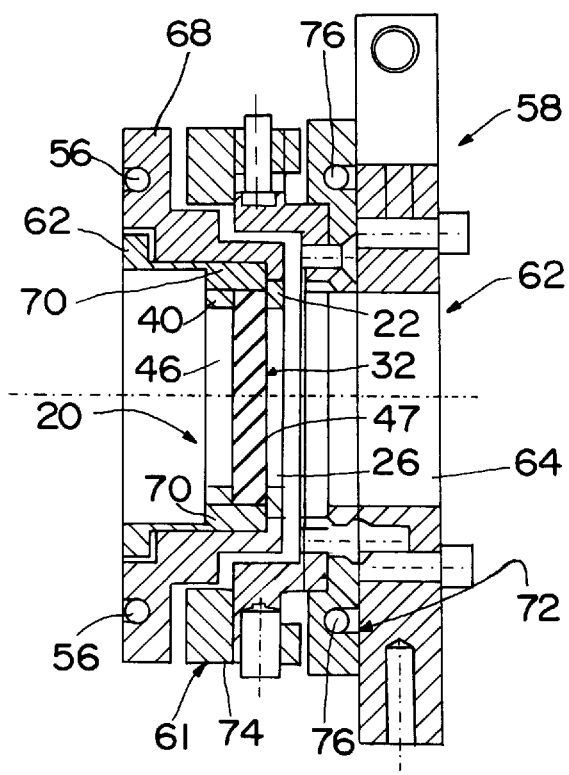
FIG. 4 is a cross-sectional view illustrating the optic cell mounted in a laser cavity.

The optic cell 20 is shown in FIG. 4 mounted within a portion of a resonator cavity 58 of a laser. An optic cell with a fully reflecting mirror (not shown) is typically mounted at the opposite end of the cavity in alignment with the optic cell 20. The optic cell at the opposite end prevents excessive heating of the fully reflecting mirror to enhance laser beam alignment and minimize light losses in the resonator cavity 58. An optic cell mount 61 is shown mounting the optic cell 20 to the resonator plate 62 which defines a laser beam passage 64. The optic cell mount 61 comprises a first mounting ring 66 and a second mounting ring 68, which mates with the first mounting ring 66. The first mounting ring 66 and the second mounting ring 68 together clamp the optic cell 20 to provide a uniform, thermally conductive, circumferential interface 70 between the optic housing 22 and the second mounting ring 68. The interface 70 enables the temperature of the optic housing 22 and the optic cover 40 to remain approximately equal during laser operation. Consequently, thermal stresses in the optic element 32 are minimized and the optic element 32 prescription remains substantially unaffected during laser operation.

The optic cell mount 61 can further comprise an optic cell mount adapter 72 which is fastened to the resonator plate 62 and to a third mounting ring 74, to enable the optic cell mount 61 to be retrofitted in various resonator cavities.

The optic cell 20 greatly reduces thermal gradients to the interface 70 of the optic cell 20 and the optic cell mount 61. Heat can be removed from the optic element 32 by various standard techniques at one or more selected locations. For example, longitudinally spaced, cooling conduits 56, 76 can be provided in the optic cell mount 61. The location and number of such cooling conduits in the optic cell mount 61 can be selectively varied. The capability of removing heat from the optic cell 20 at selected locations of the optic cell mount 61 eliminates the need to remove heat at the precision interface 70 between the optic cell 20 and the optic cell mount 61. This simplifies the construction of the optic cell mount 61 and reduces its cost.

Other types of cooling elements such as edge bars and thermoelectric coolers (not shown) can alternately be used to cool the optic cell 20.

The optic element 32 typically absorbs less than about 0.05% of the power of the incident laser beam. The associated absorbed heat must be removed from the optic cell 20 to prevent detrimental heating effects in the optic element 32. The optic cell 20 reduces heating of the optic element 32, thus reducing the cooling requirements of the laser. Based on calculated estimates, during operation of a 6 kW high-power laser having cooling elements such as the coolant conduits 56 surrounding the optic cell 20, the window 47 of the optical element 32 reaches a temperature of about 95° C. Without providing the optic cell 20 to mount the optic element 32, the estimated temperature reached at the window 47 is about 135° C.

The optic cell 20 also significantly minimizes the surface temperature of the window 47, thereby minimizing resulting convective air currents in the resonator cavity 58 that reduce the laser beam quality. By minimizing the temperature reached by the optic element 32, the optic cell 20 minimizes thermal gradients in the optic element 32 substrate, thereby reducing thermal and optical distortion effects that can degrade the laser beam quality.

The optic cell 20 construction provides other advantages. Particularly, the optic cell 20 provides precise, simplified mechanical positioning of the optic element 32. The optic cell 20 can have a modular, standardized construction, allowing its easy replacement should the optic element 32 become damaged. The optic cell 20 can be treated in the same manner as a conventional optic element and no cooling system dismantling is required to replace the optic cell 20. In addition, the optic cell 20 provides mechanical protection of the optic element 32 during handling and installation to prevent costly damage.

The optic cell 20 can alternately be used in low-power lasers.

Although the present invention has been described in considerable detail with reference to certain preferred versions thereof, other versions are possible. Therefore, the scope of the appended claims should not be limited to the description of the preferred versions contained herein.

What is claimed is:

1. An optic cell for use in a laser cavity in which a laser beam is generated during operation, the optic cell comprising:
   a) an optic housing including a wall defining a first laser beam aperture therethrough, the optic housing being comprised of a thermally conductive material;
   b) an optic element disposed within the optic housing;
   c) a first layer between and in abutting contact with the wall of the optic housing and the optic element, the first layer being comprised of a thermally conductive material;
   d) an optic cover defining a second laser beam aperture therethrough, the optic housing being comprised of a thermally conductive material;
   e) a second layer between and in abutting contact with the optic element and the optic cover, the second layer being comprised of a thermally conductive material; and
   f) the first and second laser beam apertures being substantially in alignment with each other and defining a window of the optic element through which the laser beam passes.

2. The optic cell of claim 1, wherein the first and second layers are comprised of indium.

3. The optic cell of claim 1, wherein the optic cover and the optic housing form an interface, and the optic cover and the optic housing are fixedly secured to each other at the interface by indium.

4. The optic cell of claim 1, wherein the first and second laser apertures are sized and shaped to (i) minimize the heat transfer distance between the optic element and the optic housing and the optic cover, and (ii) allow the laser beam to pass through the window of the optic element without impinging on the optic housing and optic cover.

5. The optic cell of claim 1, wherein the laser beam has a substantially rectangular cross-section and has a height and a width, the first and second laser beam apertures are each substantially rectangular shaped and each have a height equal to about twice the height of the laser beam, and a width equal to about twice the width of the laser beam.

6. The optic cell of claim 1, wherein the optic housing and the optic cover are comprised of copper or aluminum.

7. The optic cell of claim 1, wherein the optic element is selected from the group consisting of mirrors, lenses, prisms and polarizers.

8. An optic cell for use in a laser cavity in which a laser beam is generated during operation, the optic cell comprising:
   a) a metallic optic housing including a wall defining a first laser beam aperture therethrough;
   b) an optic element disposed within the optic housing;
   c) a first indium layer between and in abutting contact with the wall of the optic housing and the optic element;
   d) a metallic optic cover defining a second laser beam aperture therethrough;
   e) the optic housing and the optic cover being joined by a thermal conductive material;

f) a second indium layer disposed between and in abutting contact with the optic element and the optic cover; and g) the first and second laser beam apertures being substantially in alignment with each other and defining a window of the optic element through which the laser beam passes;

h) wherein, the optic cell (i) minimizes thermal gradients in the optic element, and (ii) minimizes the surface temperature of the window during operation of the laser.

9. The optic cell of claim 8, wherein the optic cover and the optic housing form an interface therebetween, and the optic cover and the optic housing are joined together at the interface by indium.

10. The optic cell of claim 8, wherein the first and second laser apertures are sized and shaped to (i) minimize the heat transfer distance between the optic element and the optic housing and the optic cover, and (ii) allow the laser beam to pass through the window of the optic element without impinging on the optic housing and optic cover.

11. The optic cell of claim 8, wherein the laser beam has a substantially rectangular cross-section and has a height and a width, the first and second laser beam apertures are each substantially rectangular shaped and each have a height equal to about twice the height of the laser beam, and a width equal to about twice the width of the laser beam.

12. An optic cell assembly for use in a laser cavity in which a laser beam is generated during operation of the laser, the optic cell assembly comprising:

a) an optic cell, comprising:
   i) an optic housing including a wall defining a first laser beam aperture therethrough, the optic housing being comprised of a thermally conductive material;
   ii) an optic element disposed within the optic housing;
   iii) a first layer between and in abutting contact with the wall of the optic housing and the optic element, the first layer being comprised of a thermally conductive material;
   iv) an optic cover defining a second laser beam aperture therethrough, the optic housing being comprised of a thermally conductive material;
   v) a second layer between and in abutting contact with the optic element and the optic cover, the second layer being comprised of a thermally conductive material; and
   vi) the first and second laser beam apertures being substantially in alignment with each other and defining a window of the optic element through which the laser beam passes; and b) an optic cell mount, comprising:
   i) clamping means for removably fixing the optic cell in the laser cavity; and
   ii) cooling means for cooling the optic cell during operation of the laser.

13. The optic cell assembly of claim 12, wherein the first and second layers are comprised of indium.

14. The optic cell assembly of claim 13, wherein the optic cover and the optic housing form an interface, and the optic cover and the optic housing are joined together at the interface by indium.

15. The optic cell assembly of claim 12, wherein the first and second laser apertures are sized and shaped to (i) minimize the heat transfer distance between the optic element and the optic housing and the optic cover, and (ii) allow the laser beam to pass through the window of the optic element without impinging on the optic housing and optic cover.

16. The optic cell assembly of claim 12, wherein the laser beam has a substantially rectangular cross-section and has a height and a width, the first and second laser beam apertures are each substantially rectangular shaped and each have a height equal to about twice the height of the laser beam, and a width equal to about twice the width of the laser beam.

17. The optic cell assembly of claim 12, wherein the optic housing and the optic cover are comprised of copper or aluminum.

18. The optic cell assembly of claim 12, wherein the clamping means forms a thermally conductive interface with an outer face of the optic cell such that the temperatures of the optic housing and the optic cell are approximately equal during operation of the laser.

19. The assembly of claim 18, wherein the cooling means comprises at least one cooling conduit disposed in the clamping means.

20. A high-power laser, comprising:

a) a resonator cavity in which a laser beam is generated during operation;

b) at least one optic cell disposed in the cavity, the optic cell comprising:
   i) an optic housing including a wall defining a first laser beam aperture therethrough, the optic housing being comprised of a thermally conductive material;
   ii) an optic element disposed within the optic housing;
   iii) a first layer disposed between and in abutting contact with the wall of the optic housing and the optic element, the first layer being comprised of a thermally conductive material;
   iv) an optic cover defining a second laser beam aperture therethrough, the optic cover being comprised of a thermally conductive material;
   v) a second layer disposed between and in abutting contact with the optic element and the optic cover, the second layer being comprised of a thermally conductive material; and
   vi) the first and second laser beam apertures being substantially in alignment and defining a window through which the laser beam passes; and c) an optic cell mount, comprising:
   i) clamping means for removably fixing the optic cell in the laser cavity; and
   ii) cooling means for cooling the optic cell during operation of the laser.

* * * * *